United States Patent
Kao et al.

(10) Patent No.: US 8,289,373 B2
(45) Date of Patent: Oct. 16, 2012

(54) IMAGE PROCESSING METHOD FOR MULTI-DEPTH-OF-FIELD 3D-DISPLAY

(75) Inventors: Meng-Chao Kao, Taipei (TW); Tzu-Chiang Shen, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 752 days.

(21) Appl. No.: 12/431,230

(22) Filed: Apr. 28, 2009

(65) Prior Publication Data

US 2010/0271459 A1 Oct. 28, 2010

(51) Int. Cl.
*H04N 13/00* (2006.01)
(52) U.S. Cl. .......................................... 348/43; 382/154
(58) Field of Classification Search ................. 348/273, 348/46; 375/240.08; 345/419; 382/154, 382/173
See application file for complete search history.

(56) References Cited

U.S. PATENT DOCUMENTS

| | | | | |
|---|---|---|---|---|
| 6,301,385 | B1 * | 10/2001 | Chen et al. | 382/173 |
| 6,738,424 | B1 * | 5/2004 | Allmen et al. | 375/240.08 |
| 2002/0085219 | A1 * | 7/2002 | Ramamoorthy | 358/1.9 |
| 2004/0090523 | A1 * | 5/2004 | Kondo et al. | 348/46 |
| 2004/0247176 | A1 * | 12/2004 | Aucsmith et al. | 382/154 |
| 2007/0120843 | A1 * | 5/2007 | Park et al. | 345/419 |
| 2009/0284627 | A1 * | 11/2009 | Bando et al. | 348/273 |

* cited by examiner

*Primary Examiner* — Jungwon Chang
(74) *Attorney, Agent, or Firm* — WPAT, PC; Justin King

(57) ABSTRACT

A multi-depth-of-field 3D-display image processing method is provided. An input image is divided into a foreground and a background signal, resolutions of the foreground and the background signals are compressed into half, the foreground and the background signals with half resolution are synthesized into a relay image to be displayed at a first and a second side of the relay image respectively, and the background signal of the relay image is reversed towards the other side. The relay image is then input to a play device, and a processing circuit reads a forward pixel data and a backward pixel data simultaneously and provides the data to a front and a back panel respectively. The processing circuit magnifies the first side of the front panel and the back panel into a full screen picture towards a predetermined direction, so as to output a full picture 3D image.

10 Claims, 10 Drawing Sheets

IMAGE PROCESSING METHOD FOR MULTI-DEPTH-OF-FIELD 3D-DISPLAY

BACKGROUND OF THE INVENTION

1. Field of the Technology

The present invention relates to image processing technology, and more particularly to an image processing method for multi-depth-of-field 3D-display, which divides an image into a foreground and a background to be displayed by a front panel and a back panel respectively, presents a 3D impression by a distance between the front panel and the back panel, and provides signals to the front panel and the back panel simultaneously to achieve a synchronous display.

2. Background of the Invention

The displays are always the most frequently used electronic product for people, and advances of the display also indicate that humans are pursuing more real visual experience. From early black-and-white TV to color TV, and current high definition TV, all of which are pursuing more natural, more real image quality. The development of 3D-display also provides people with further visual senses, and further provides perception of 3D space in addition to common images and colors. The human brain may utilize binocular parallax to determine the sense of distance of object. These 3D feelings can provide people with greater reliability when determining image information, and therefore, with the vigorous development of display technology, the application of 3D image display is increasingly diverse.

Generally speaking, a 3D-display must be provided with characteristics including binocular parallax and motion parallax. The so called binocular parallax refers to a displacement of about 6.5 centimeters (statistic of Europeans) in the horizontal direction of left eye and right eye of an observer, such that when watching an object, the received contents of image are slightly different due to small differences between observing angles. The motion parallax means that when the locations of eyes of the observer move, the observing angles change accordingly, and the contents received by eyes are thus different. So if we hope to receive a 3D image, we should make the left eye and the right eye to receive individual images with slight difference.

FIGS. 1a and 1b are schematic views representing fusion along a depth direction and continuous depth variation when the front panel and the back panel are playing images with different brightness respectively according to the prior art. The 3D impression of the image to an observer is generated by the distance between the front panel D1 (adjacent to the observer) and the back panel D2 (away from the observer) and the two images with different brilliances on the front panel and the back panel respectively and the binocular parallax. With this principle, the Japanese NTT company provides a method of utilizing two overlapping liquid crystal panels to display two images with the same size, such that the images of the front and back objects are overlapped by utilizing the different distances of the objects away from the observer and the differences of darkness and color, so as to present the 3D impression to the observer. However, the method has the disadvantages such as the difficulty of aligning the front panel and the back panel, and moreover, due to the overlapping of two 2D images, the 3D impression is preferred only when observing from a front direction but not obvious at other observing angles.

FIGS. 2a and 2b are schematic views representing a first image processing method and a second image processing method in the prior art respectively. As for image processing of two (or more) panels described above, the image signals corresponding to each panel must be provided, and the commonly used method (disclosed in pure depth limited) is utilizing a display card with two outputs (the first image processing method as shown in FIG. 2a) and utilizing two computers or play devices (the second image processing method as shown in FIG. 2b).

The first image processing method requires the computer C1 to be provided with special software S1, so that the display card B1 is able to output the corresponding image signals to the front panel D1 and the back panel D2 simultaneously, achieving the effect of synchronous output. While the second image processing method requires two computers C1, C2 or play devices (not shown), and utilizes other communication interface (not shown) or another console (C3) responsible for controlling to command the two computers C1, C2 to play synchronously.

However, the two image processing methods both require computers with special specification for synchronous control of the image output, otherwise, it is difficult to synchronize the signals provided to the front panel and the back panel, and they are unable to be used by the play device (such as DVD, cable TV, and PS3) used in common families.

In view of the problems described above, an image processing method is provided for multi-depth-of-field 3D-display, so as to overcome the defects of the conventional technologies.

SUMMARY OF THE INVENTION

An object of the present invention is to provide an image processing technology for a front panel and a back panel to display respectively, presenting a 3D impression with a distance between the front panel and the back panel, and processing the input image signal and distributing the processed image signal to the front panel and the back panel simultaneously for a user to connect to any image output device, thus achieving an image processing method for the front panel and the back panel outputting simultaneously.

It is a further object of the present invention to provide an image processing method being able to be used in any play device.

Another object is to provide an image processing method having simple and fast processing flow without increasing the cost of circuit.

A further object is to provide an image processing method capable of outputting 3D image and 2D image simultaneously.

To achieve the above objects, an image processing method is provided for a multi-depth-of-field 3D-display, the 3D-display at least having a front panel and a back panel, the method comprising:

obtaining a foreground signal and a background signal by dividing an input image, compressing resolutions of the foreground signal and the background signal in a predetermined direction into half, and synthesizing the foreground signal and the background signal with half resolution into a relay image, the foreground signal and the background signal with half resolution being displayed at a first side and a second side of the relay image respectively, and reversing the background signal with half resolution of the relay image into an other side, and storing, by a line data storage, data of each scanning line of the foreground signal and the background signal;

inputting the relay image into a play device, and reading a forward pixel data and providing a forward pixel data to the front panel, and reading a backward pixel data and providing a backward pixel data to the back panel simultaneously by utilizing a processing circuit of the play device; and magnifying, by the processing circuit of the play device, a first side of the front panel and the back panel into a full screen picture towards the predetermined direction, so as to output a full picture 3D image.

Preferably, a signal received by the back panel is a full picture reversed from left to right, and the foreground signal and the background signal at the left side of the front panel and the right panel are laminated into a half picture 3D image.

Preferably, the predetermined direction is a vertical direction, the first side and the second side are an upper side and a lower side respectively, and the background signal of the relay image is reversed top to bottom.

The present invention further provides an image processing method for a multi-depth-of-field 3D-display, the 3D-display at least having a front panel and a back panel, the method comprising:

obtaining a foreground signal and a background signal by dividing an input image, compressing resolutions of the foreground signal and the background signal in a predetermined direction into half, synthesizing the foreground signal and the background signal with half resolution into a relay image, the foreground signal and the background signal with half resolution being displayed at a first side and a second side of the relay image respectively, and reversing the background signal with half resolution of the relay image towards an other side, and storing, by a line data storage, data of each scanning line of the foreground signal and the background signal;

inputting the relay image into a play device, and reading a forward pixel data and providing a forward pixel data to the front panel, and reading a backward pixel data and providing a backward pixel data to the back panel simultaneously by utilizing a processing circuit of the play device; and summing, by the processing circuit of the play device, the pixel data of the first side of the front panel and the back panel, disposing the data to the second side of the back panel, and forming the second side of the front panel as a transparent picture simultaneously.

Preferably, the transparent picture is a total black picture or a total white picture.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE EMBODIMENTS

The present invention is illustrated through several preferred embodiments, but the accompanying drawings and detailed description below are merely preferred embodiments of the present invention. It should be noted that, the detailed description disclosed below is only examples of the present invention, and the present invention is not limited to the drawings and detailed description below.

The embodiments of the present invention are described in detail as below.

Figure 1A:
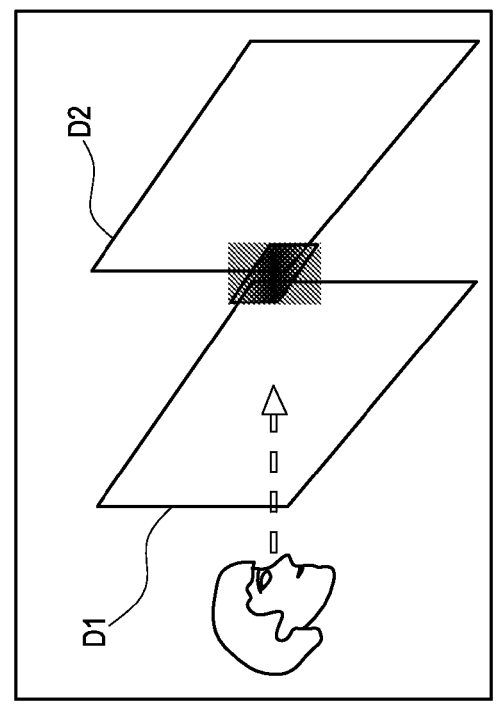
FIG. 1a is a schematic view representing fusion along a depth direction when the front panel and the back panel are playing images with different brightness in the prior art.
Figure 1A:
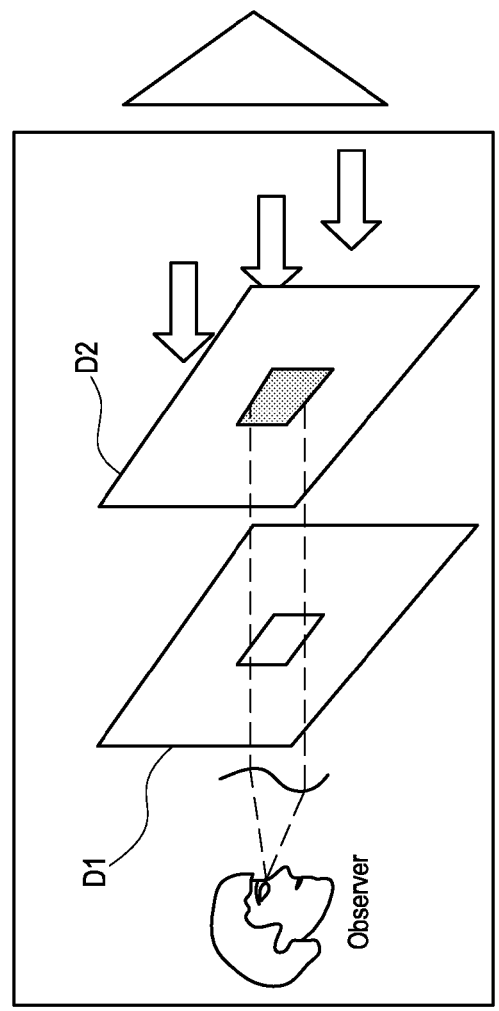
Figure 1B:
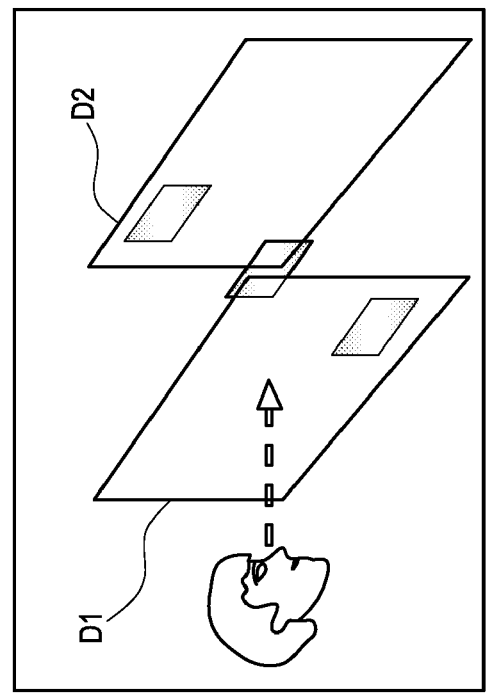
FIG. 1b is a schematic view representing continuous depth variation when the front panel and the back panel are playing images with different brightness in the prior art.
Figure 1B:
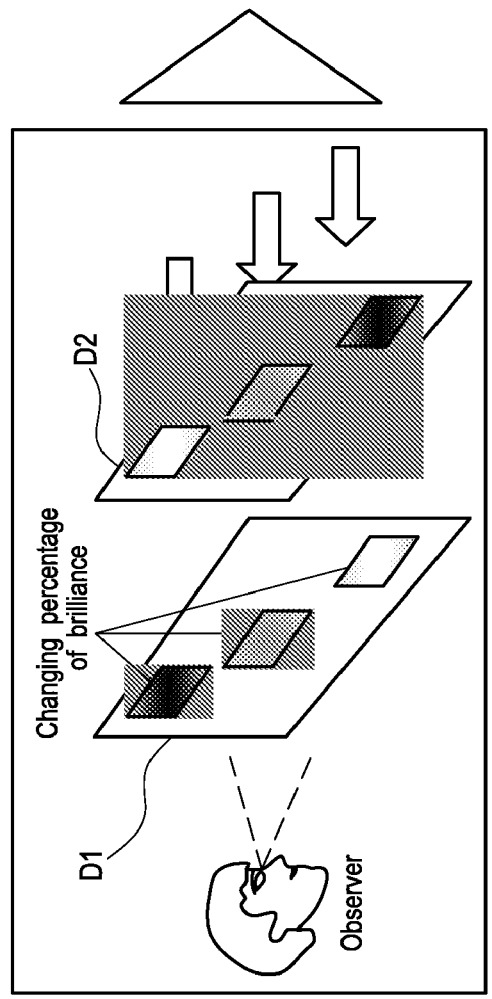
Figure 2A:
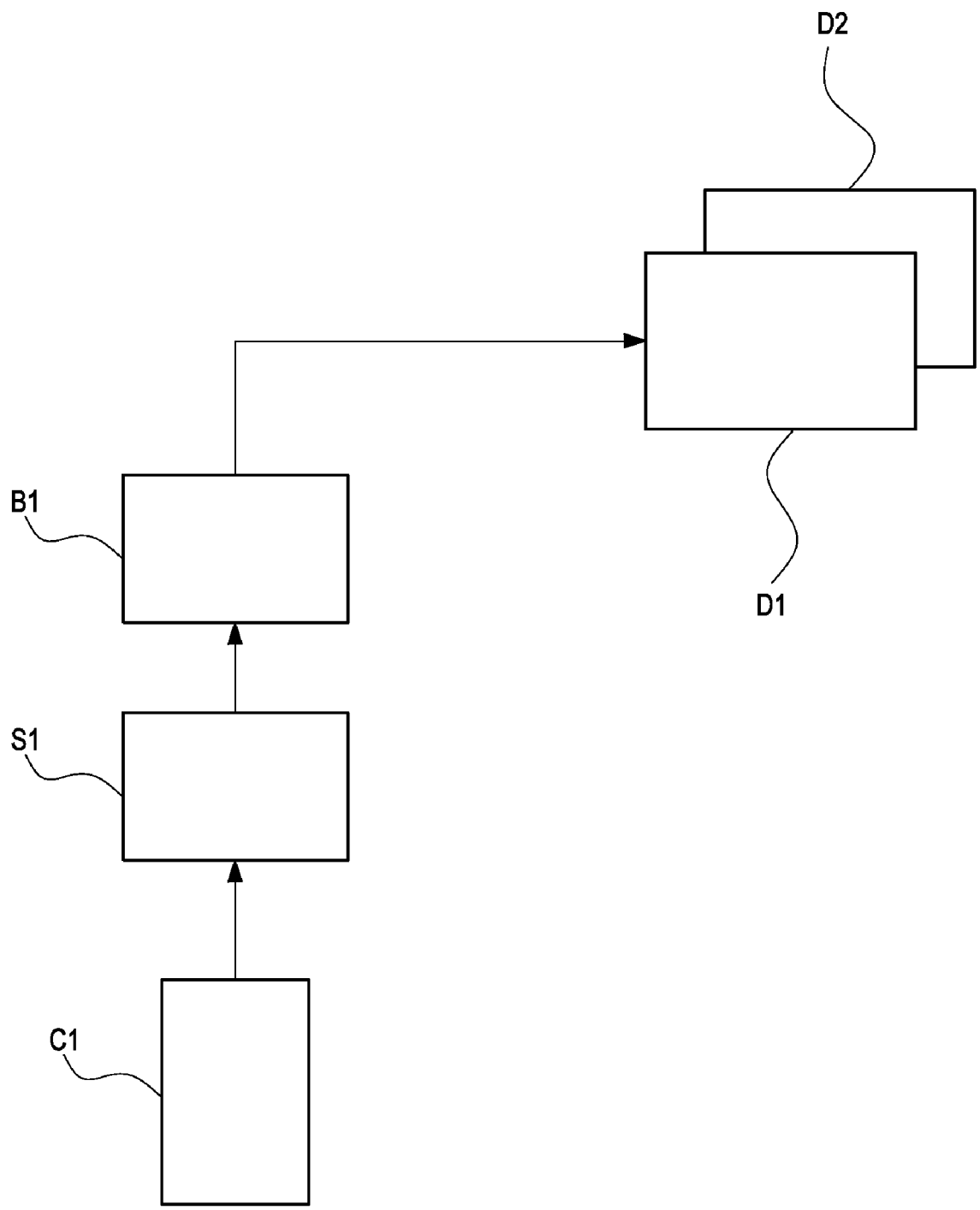
FIG. 2a is a schematic view representing a first conventional image processing method.
Figure 2B:
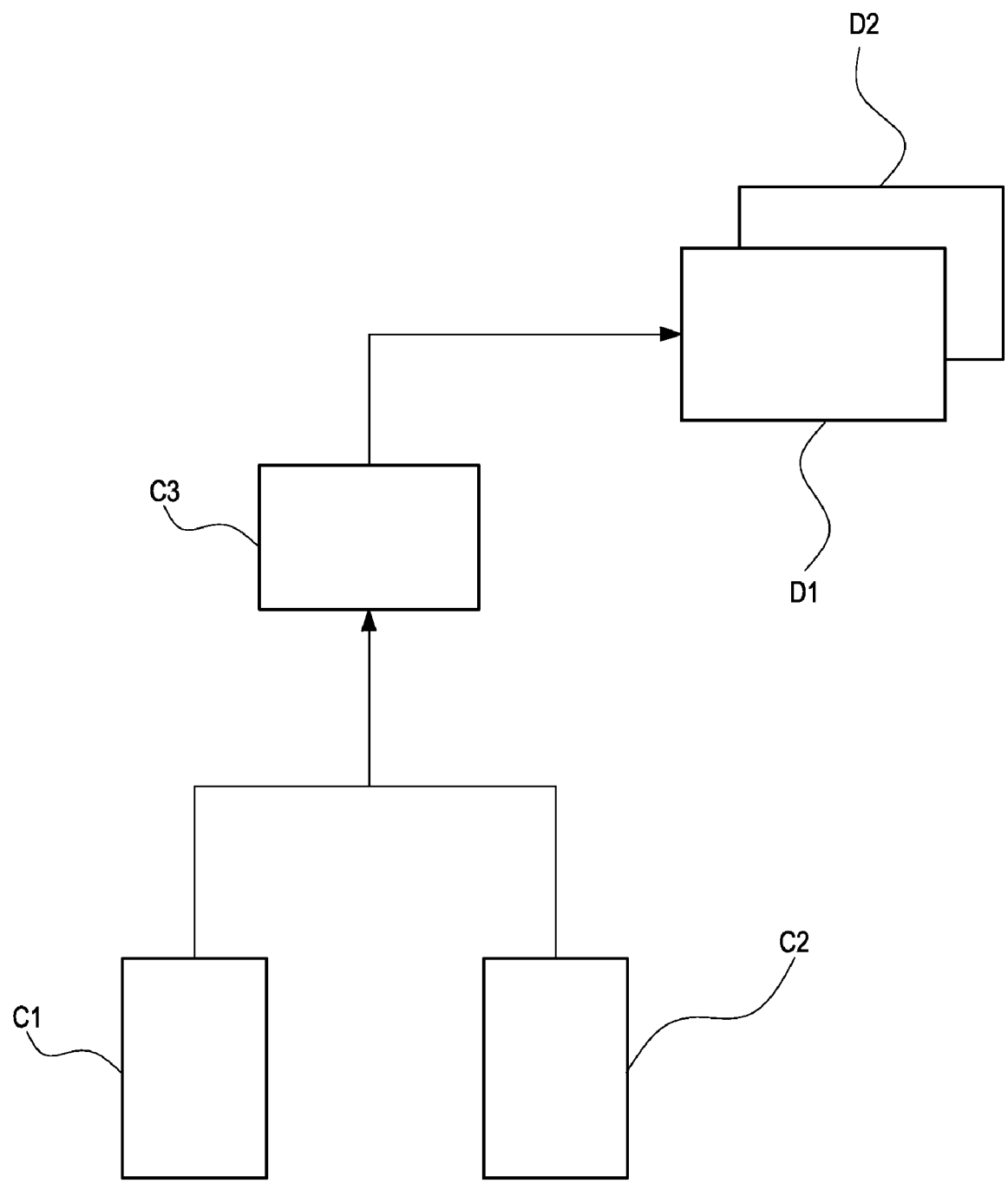
FIG. 2b is a schematic view representing a second conventional image processing method.
Figure 3:
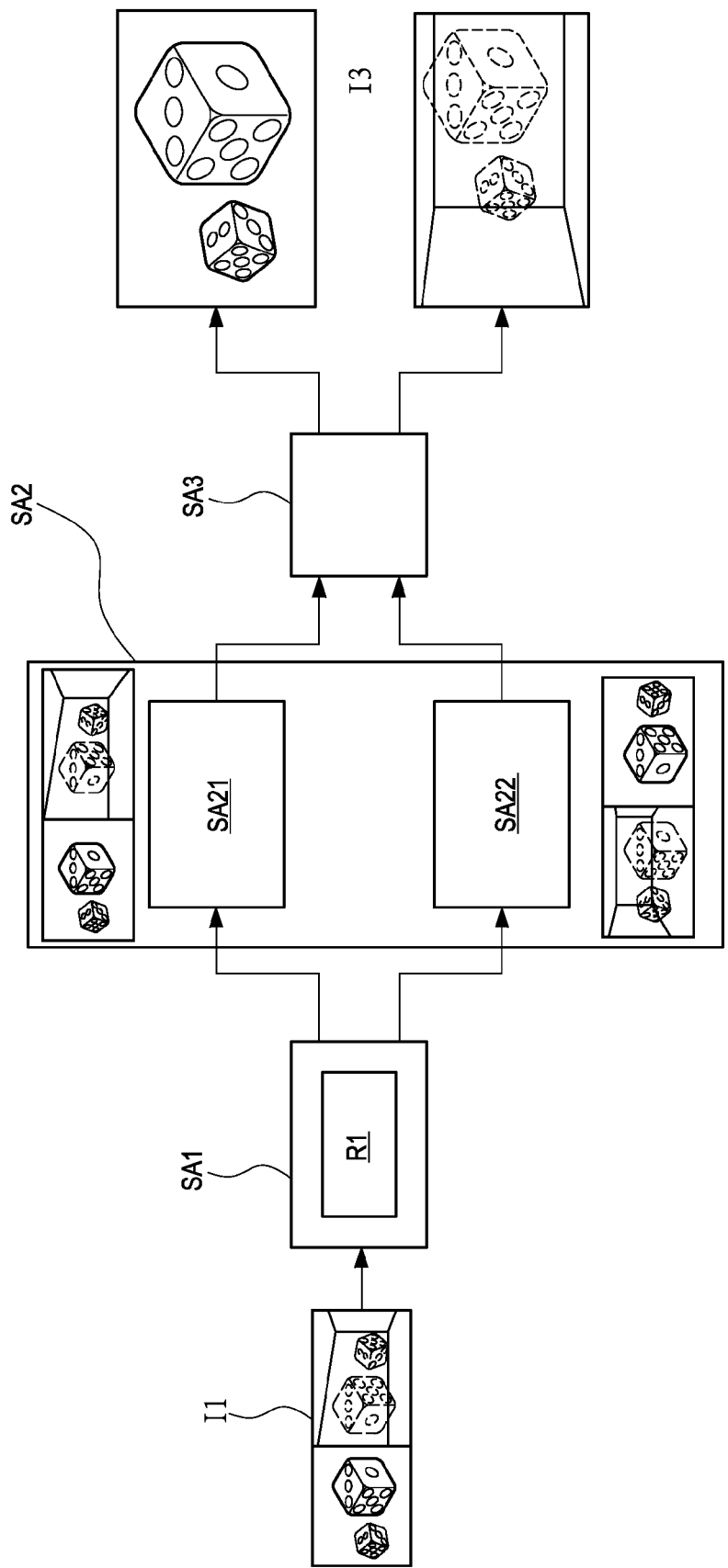
FIG. 3 is a block diagram of a first embodiment of the present invention.

FIG. 3 is a block diagram of a first embodiment of the present invention. Referring to FIG. 3, this embodiment enables an observer to observe a 3D image directly, and the method includes the following steps.

In step SA1, a foreground signal FS and a background signal BS are obtained by dividing an input image, the resolutions of the foreground signal FS and the background signal BS are compressed in a predetermined direction into half, and the foreground signal FS and the background signal BS with half resolution are synthesized into a relay image I1, where the foreground signal FS and the background signal BS are displayed at a first side and a second side of the relay image I1 respectively, and the background signal BS of the relay image I1 is reversed to the other side, and data of each scanning line of the foreground signal FS and the background signal BS is stored by a line data storage R1.

Figure 4A:
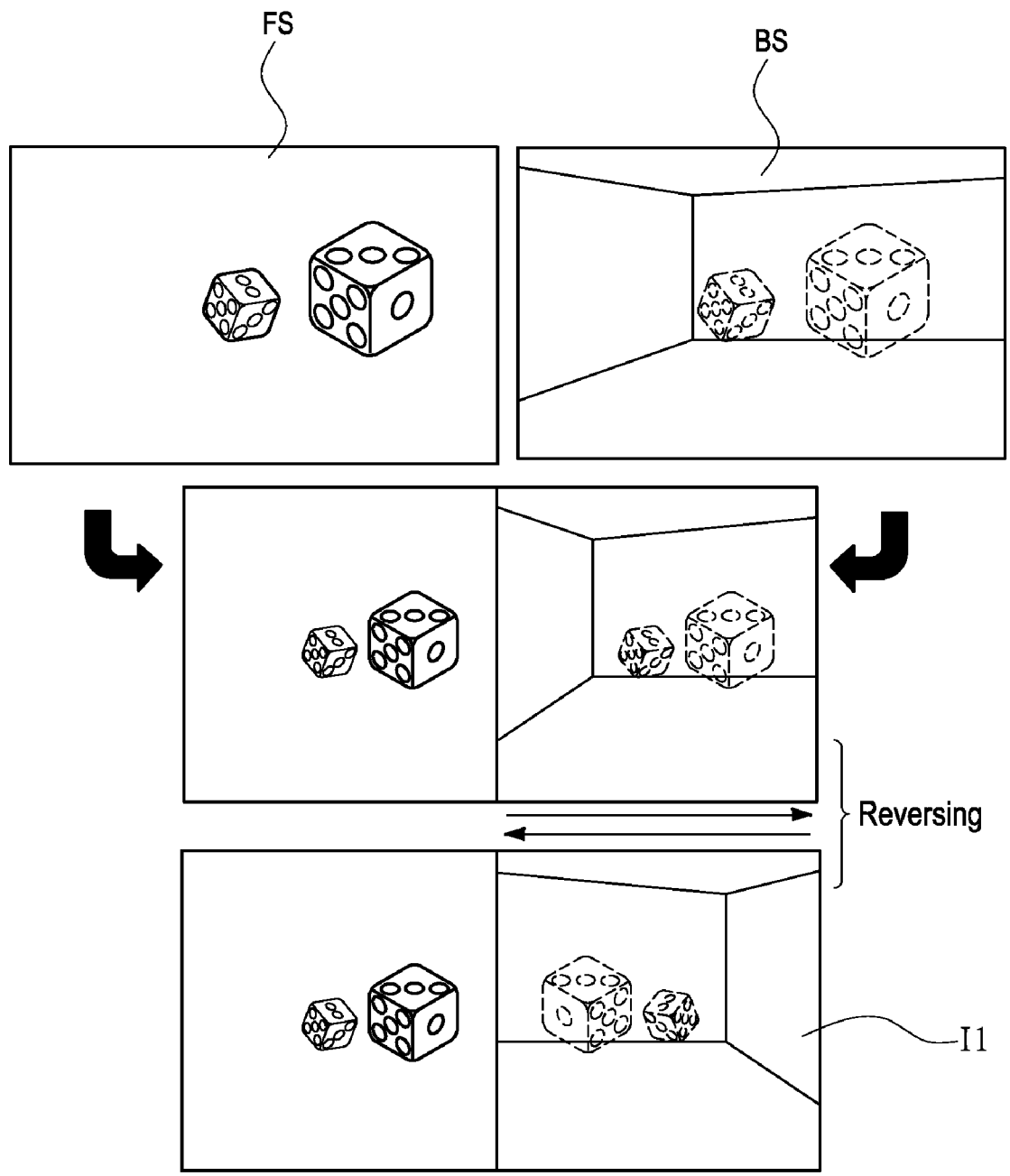
FIG. 4a is a schematic view of step SA1 in the first embodiment of the present invention.
Figure 4B:
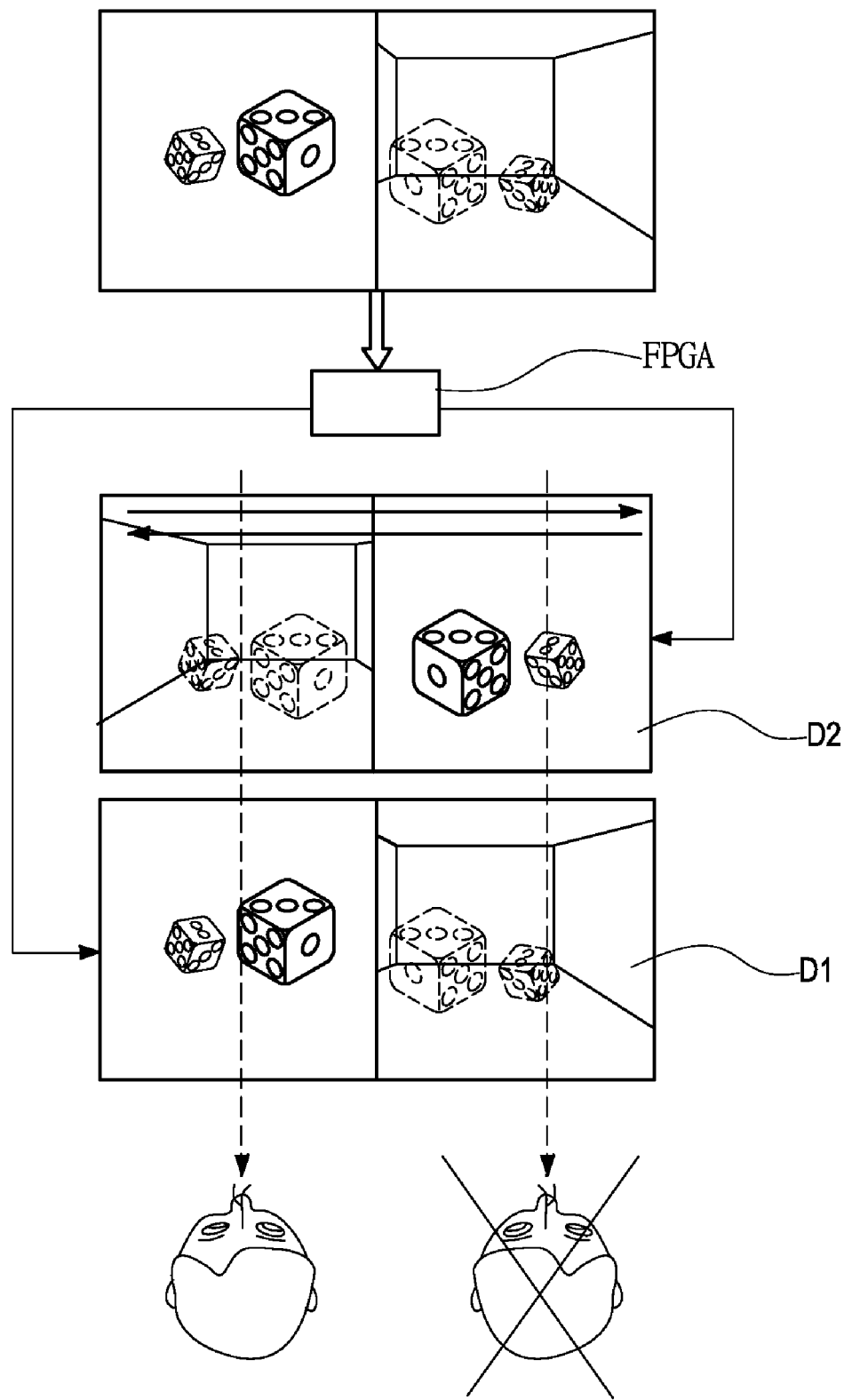
FIG. 4b is a schematic view of step SA2 in the first embodiment of the present invention.

In step SA2, the relay image I1 is input into a play device (not shown), and a processing circuit FPGA (as shown in FIG. 4b) of the play device is used to read the forward pixel data simultaneously and provide the forward pixel data to the front panel (step SA21), and read the backward pixel data and provide the backward pixel data to the back panel (step SA22).

In step SA3, the first sides of the front and back panel D1 and D2 are magnified into a full screen picture towards the predetermined direction of step SA1, so as to output the full picture 3D image I3.

In the step SA1, if the predetermined direction is a horizontal direction, the first side and the second side are a left side and a right side respectively (as shown in FIG. 4a, this embodiment is illustrated by taking this as an example), and the background signal BS of the relay image I1 is reversed left to right, while in this embodiment, the foreground signal FS is at the left side, the background signal BS is at the right side. In addition, if the predetermined direction is a vertical direction, the first side and the second side are the upper side and the lower side, and the background signal BS of the relay image I1 is reversed top to bottom (not shown).

In the step SA2, the signal received by the back panel D2 is a full picture reversed left to right, and the foreground signal FS and the background signal BS (picture) of the left side of the front panel D1 and the back panel D2 are laminated as a half picture 3D image (as shown in FIG. 4b).

Figure 4C:
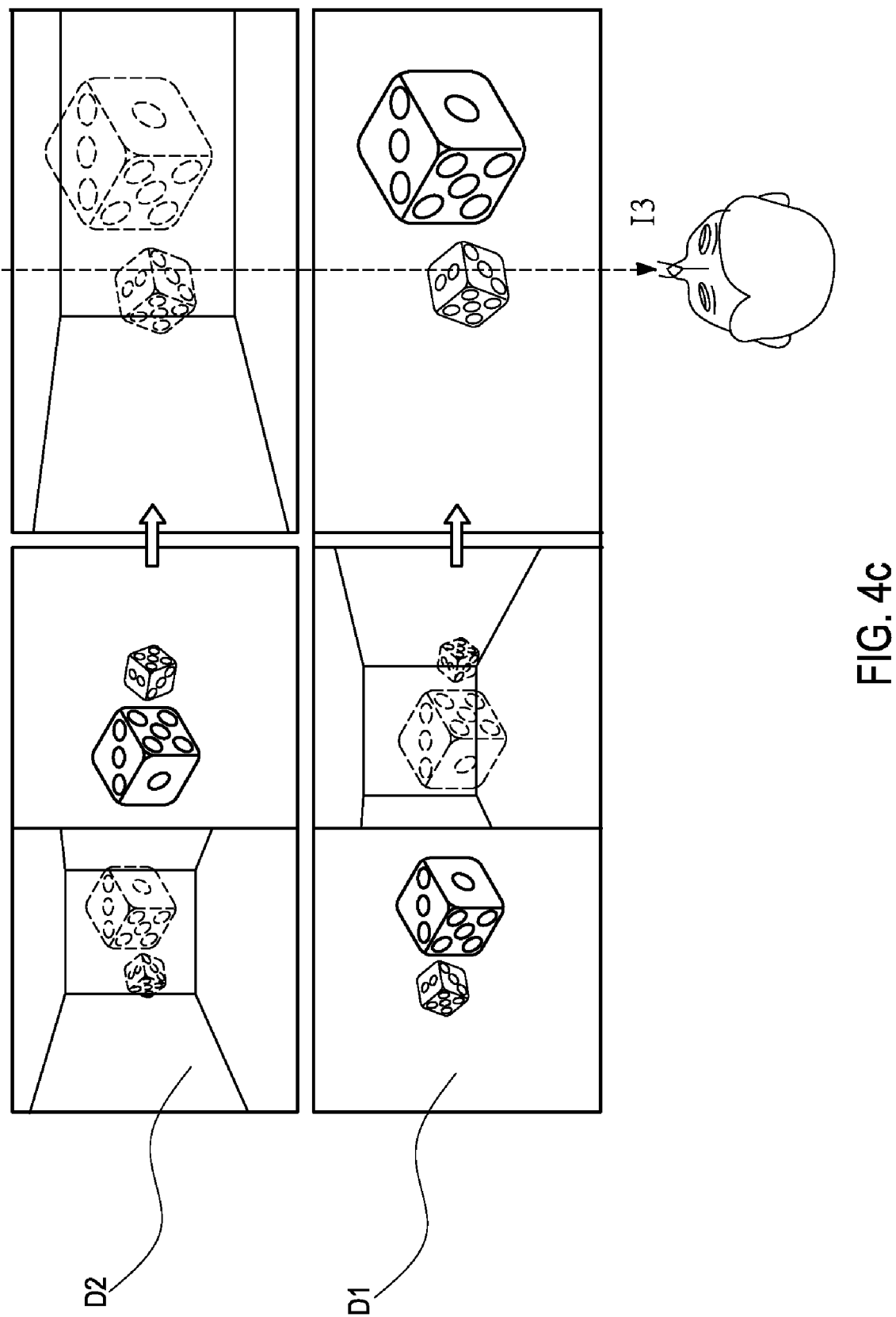
FIG. 4c is a schematic view of step SA3 in the first embodiment of the present invention.

In the step SA3, the foreground signal FS and the background signal BS (picture) of the left side of the front panel D1 and the back panel D2 are magnified towards the horizontal direction, thereby generating a full picture 3D image I3 output (as shown in FIG. 4c).

Figure 5:
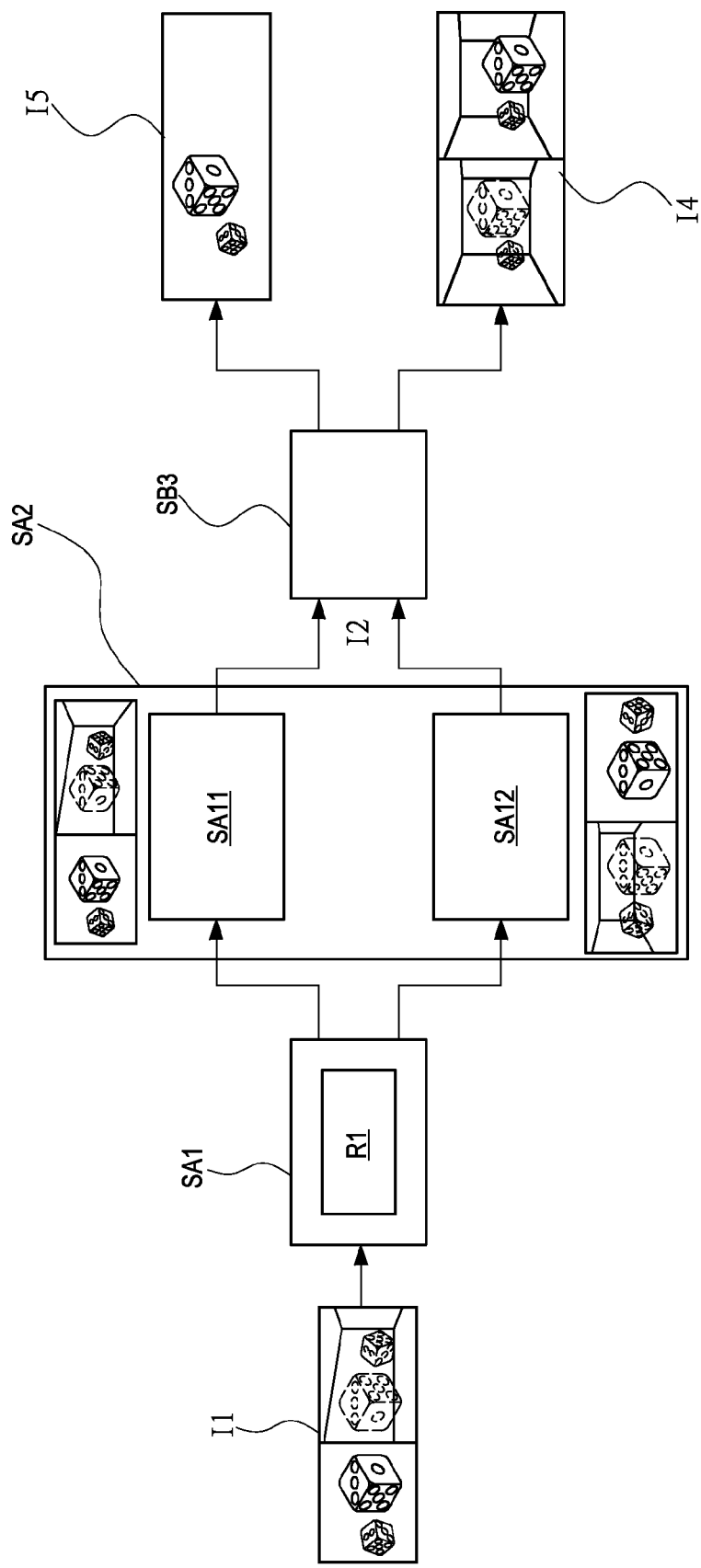
FIG. 5 is a block diagram of a second embodiment of the present invention.

FIG. 5 is a block diagram of a second embodiment of the present invention. Referring to FIG. 5, this embodiment enables an observer to observe a 3D image and a 2D image, the first two steps of the method are the same as those of the first embodiment, and the differences between the two embodiments are described as follows.

In step SB3, the pixel data of a first side of the front panel D1 and the back panel D2 are summed by the processing circuit FPGA (as shown in FIG. 4b) of the play device and disposed at a second side of the back panel D2, and the second side of the front panel D1 is formed as a transparent picture T.

Figure 6:
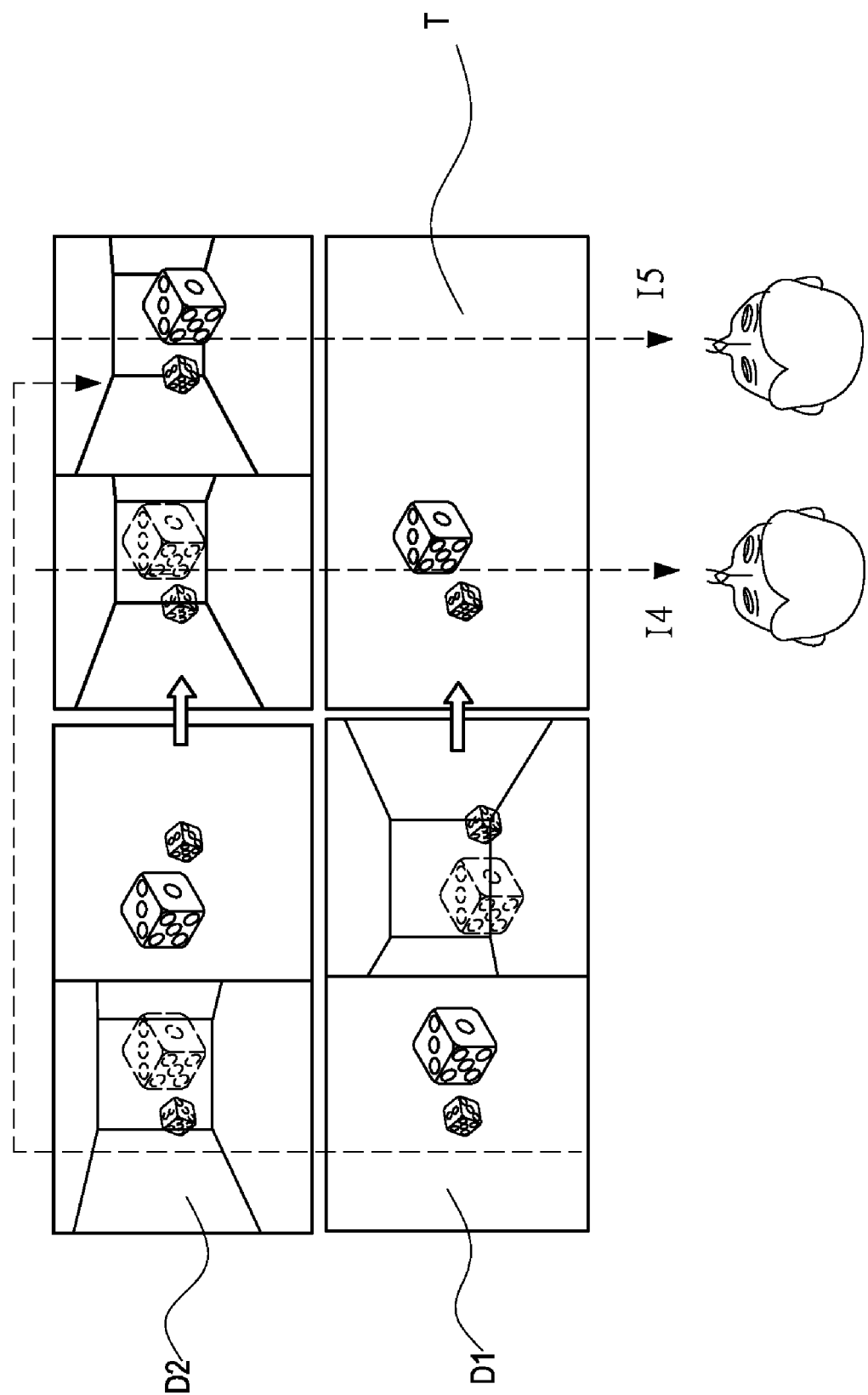
FIG. 6 is a schematic view of step SB3 in the second embodiment of the present invention.

In step SB3, for the observer, a half picture 3D image I4 can be seen from the left side (the first side) of the full picture image formed at the front panel D1 and the back panel D2, and a half picture 2D image I5 (as shown in FIG. 6) can be seen from the right side (the second side). The transparent picture may be a total black picture or a total white picture, and is a total black picture in this embodiment as an example.

Therefore, the following advantages can be achieved by the methods above.

1. The front panel and the back panel are capable of displaying synchronously.
2. This method is able to be used by any image play device.
3. This method has simple image processing flow without increasing the cost of circuit.
4. This method is capable of outputting a 3D image and a 2D image simultaneously, thus facilitating comparison.

It will be apparent to those skilled in the art that various modifications and variations can be made to the structure of the present invention without departing from the scope or spirit of the present invention. Therefore, the content of the specification of the present invention shall not be considered as restricting the present invention.

What is claimed is:

1. An image processing method for a multi-depth-of-field 3D-display, the 3D-display at least having a front panel and a back panel, the method comprising:
   dividing an input image into a foreground signal and a background signal, compressing resolutions of the foreground signal and the background signal in a predetermined direction into half, and synthesizing the foreground signal and the background signal with half resolution into a relay image, the foreground signal and the background signal with half resolution being displayed at a first side and a second side of the relay image respectively, and reversing the background signal with half resolution of the relay image into an other side, and storing, by a line data storage, data of each scanning line of the foreground signal and the background signal;
   inputting the relay image into a play device, and reading a forward pixel data and providing a forward pixel data to the front panel, and reading a backward pixel data and providing a backward pixel data to the back panel simultaneously by utilizing a processing circuit of the play device; and
   magnifying, by the processing circuit of the play device, a first side of the front panel and the back panel into a full screen picture towards the predetermined direction, so as to output a full picture 3D image.

2. The image processing method according to claim 1, wherein the predetermined direction is a horizontal direction, the first side and the second side are a left side and a right side respectively, and the background signal of the relay image is reversed left to right.

3. The image processing method according to claim 2, wherein a signal received by the back panel is a full picture reversed from left to right, and the foreground signal and the background signal at the left side of the front panel and the right panel are laminated into a half picture 3D image.

4. The image processing method according to claim 1, wherein the predetermined direction is a vertical direction, the first side and the second side are an upper side and a lower side respectively, and the background signal of the relay image is reversed top to bottom.

5. An image processing method for a multi-depth-of-field 3D-display, the 3D-display at least having a front panel and a back panel, the method comprising:
   obtaining a foreground signal and a background signal by dividing an input image, compressing resolutions of the foreground signal and the background signal in a predetermined direction into half, synthesizing the foreground signal and the background signal with half resolution into a relay image, the foreground signal and the background signal with half resolution being displayed at a first side and a second side of the relay image respectively, and reversing the background signal with half resolution of the relay image towards an other side, and storing, by a line data storage, data of each scanning line of the foreground signal and the background signal;
   inputting the relay image into a play device, and reading a forward pixel data and providing a forward pixel data to the front panel, and reading a backward pixel data and providing a backward pixel data to the back panel simultaneously by utilizing a processing circuit of the play device; and
   summing, by the processing circuit of the play device, the pixel data of the first side of the front panel and the back panel, disposing the data to the second side of the back panel, and forming the second side of the front panel as a transparent picture simultaneously.

6. The image processing method according to claim 5, wherein the predetermined direction is a horizontal direction, the first side and the second side are a left side and a right side respectively, and the background signal of the relay image is reversed left to right.

7. The image processing method according to claim 6, wherein a 3D image is output at the left side of a full picture image formed at the front panel and the back panel, and a 2D image is output at the right side.

8. The image processing method according to claim 7, wherein the transparent picture is a total black picture.

9. The image processing method according to claim 6, wherein a 3D image is formed at the first side, and a 2D image is output at the second side.

10. The image processing method according to claim 5, wherein the transparent picture is a total black picture or a total white picture.

* * * * *